(12) United States Patent
Marcel

(10) Patent No.: US 6,843,148 B2
(45) Date of Patent: Jan. 18, 2005

(54) GEARED MOTOR UNIT FOR DRIVING VEHICLE EQUIPMENT, ELIMINATING ANY AXIAL PLAY IN ITS DRIVELINE

(75) Inventor: Nomerange Herve Marcel, Caen (FR)

(73) Assignee: Meritor Light Vehicle Systems - France (FR)

( * ) Notice: Subject to any disclaimer, the term of this patent is extended or adjusted under 35 U.S.C. 154(b) by 0 days.

(21) Appl. No.: 10/411,897

(22) Filed: Apr. 11, 2003

(65) Prior Publication Data

US 2003/0172761 A1 Sep. 18, 2003

Related U.S. Application Data

(62) Division of application No. 09/554,959, filed as application No. PCT/FR98/02531 on Nov. 25, 1998, now Pat. No. 6,564,666.

(30) Foreign Application Priority Data

Nov. 27, 1997 (FR) .......................................... 97 14950

(51) Int. Cl.[7] .............................................. F16H 55/24
(52) U.S. Cl. ......................................... 74/425; 74/402
(58) Field of Search ......................... 74/402, 409, 425

(56) References Cited

U.S. PATENT DOCUMENTS

| 4,790,202 A | * | 12/1988 | Hayashi et al. ............... 74/396 |
| 5,212,999 A | * | 5/1993 | Kitada .......................... 74/425 |
| 5,213,000 A | * | 5/1993 | Saya et al. .................... 74/425 |
| 5,777,411 A | * | 7/1998 | Nakajima et al. ............. 310/83 |
| 5,794,480 A | * | 8/1998 | Schonsteiner ................ 74/425 |
| 5,886,437 A | * | 3/1999 | Bohn et al. ................... 310/90 |
| 6,393,929 B1 | | 5/2002 | Quere et al. |

* cited by examiner

*Primary Examiner*—David A. Bucci
*Assistant Examiner*—Timothy McAnulty
(74) *Attorney, Agent, or Firm*—Carlson, Gaskey & Olds (57) ABSTRACT

The invention concerns a gear motor (1), in particular for driving vehicle equipment, comprising a rotor provided with a rotor shaft (6), a reduction gearbox housing (14) containing a cog wheel engaged in an endless screw of the shaft and capable of driving an output member (12). The invention is characterised in that it comprises means (12) for eliminating, under predetermined axial compression (F), all axial play between one end (6a) of the rotor shaft and the housing wall (13). Said means can comprise a plug (15) housed in the housing (14) end (13) and a piston (18), inserted between the plug (15) and the shaft (6) end (6a); the plug (15) exerts on the piston (18) and the shaft (6) the axial thrust (7) which is adjusted when being mounted, and is axially locked in the corresponding position by melting the housing (14) plastic material in the grooves or recesses (19) of the piston (18) surface, then in solidifying said plastic material. The suppression of axial play in the rotor shaft (6) eliminates all the disturbing noises caused by changes in rotational direction.

13 Claims, 6 Drawing Sheets

GEARED MOTOR UNIT FOR DRIVING VEHICLE EQUIPMENT, ELIMINATING ANY AXIAL PLAY IN ITS DRIVELINE

This application is a divisional application of U.S. patent application Ser. No. 09/554,959 filed on Aug. 22, 2000 now U.S. Pat. No. 6,564,666, which is the National stage of International Application PCT/FR98/02531 filed on Nov. 25, 1998.

BACKGROUND OF THE INVENTION.

The subject of the present invention is a geared motor unit, particularly for driving vehicle equipment, such as window lifters, sunroofs, etc, and of the type including a rotor equipped with a rotor shaft and a reduction gearbox which contains a gearwheel in mesh with a worm belonging to the rotor shaft and capable of driving an output member.

Geared motor units of this type are normally equipped with means for adjusting the axial play between one end of the rotor shaft and the wall of the reduction gearbox. The axial play in the driveling mounted in the geared motor unit is due to the combination of dimensional spreads on the various parts on assembly (shaft, endstop, box, etc.) which, placed end to end, are not as long as their housing.

Previously the axial play has been compensated for by manually using a screw housed in the end of the reduction gearbox facing the rotor shaft hole and which is immobilized by an adhesive which also provides sealing. Such a method of adjustment is lengthy to perform, expensive, and increases the overall cost of manufacture of the geared motor unit.

It is also a known practice (see U.S. Pat. No. 5,169,245) to achieve automatic compensation for the axial play in the driveling of the geared motor unit using a coil spring resting in an axial housing of the end of the reduction gearbox and a system of end stops designed to limit the compressive axial loading experienced by the coil spring to a predetermined value. This limitation is achieved by a shoulder on the inside of the wall of the reduction gearbox and against which a piston inserted between the end of the rotor shaft and the coil spring abuts.

The Patent Abstract of Japan Vol. 018 No. 297 dated Jun. 7, 1994 also discloses a geared motor unit in which an end stop, fixed by welding to one end of the reduction gearbox, eliminates any axial play between the rotor shaft and the wall of the reduction gearbox.

These devices for compensating for the axial play have a drawback which lies in the fact that they are not able to eliminate the troublesome noise of the rotor shaft caused by a change in the direction of rotation.

SUMMARY OF THE INVENTION

The object of the invention is therefore to eliminate this drawback by arranging the geared motor unit in such a way that these noises are completely eliminated.

According to the invention, the geared motor unit includes a system for eliminating, under a given compressive axial preload, any axial play between one end of the rotor shaft and the wall of the reduction gearbox.

According to one embodiment of the invention, the geared motor unit 1 includes a plug housed in the end of the reduction gearbox and a piston inserted between the plug and the end of the rotor shaft. The plug exerts the compressive axial preload, set at the time of assembly, on the piston and on the rotor shaft, and the geared motor unit also includes a system for immobilizing the piston in its axial position that corresponds to the said compressive preload.

Thus, after assembly and initial adjustment of the play by appropriate positioning of the plug and of the piston against the end of the rotor shaft, using a predetermined axial thrust, for example 100 newtons, the piston is mechanically secured to the wall of the box, in the desired axial location with respect to the rotor shaft. The latter can no longer move axially upon changes of direction of rotation, and therefore cannot cause troublesome noises.

According to one feature of the invention, the system for immobilizing the piston in its axial position includes irregularities, such as grooves, formed on the surface of the piston that contact the interior wall of the reduction gearbox. The piston is made of metal, and the piston is immobilized with respect to the wall of the reduction gear box by melting the plastic of the reduction gearbox into the irregularities. The melting may be obtained, for example, by using a sonotrode, an ultrasonic-welding machine, or alternatively by high-frequency welding.

According to another possible embodiment of the invention, the geared motor unit includes a metal plug mounted slide in an axial housing formed in the wall of the reduction gearbox facing the end of the motor shaft. Irregularities are arranged on the surface of the plug and contact the wall of the housing. The plug is moved axially until the plug abuts against the end of the motor shaft under a given compressive axial preload thrust, and the plug is then immobilized in this position to eliminate any shaft play.

This embodiment therefore has no piston, the plug alone fulfilling the function of the plug and the piston of the previous embodiment and is immobilized in the desired position to exert appropriate axial thrust on the motor shaft.

The basic idea underlying the invention therefore consists in eliminating the axial play left in geared motor units of the state of the prior art and in doing so under a given compressive axial preload or thrust, for example of the order of 100 newtons.

BRIEF DESCRIPTION OF THE DRAWINGS

Other specific features and advantages of the invention will become apparent during the course of the description which will follow, which is given with reference to the appended drawings which illustrate a number of embodiments thereof by way of non-limiting examples.

DETAILED DESCRIPTION OF THE PREFERRED EMBODIMENT

Figure 1:
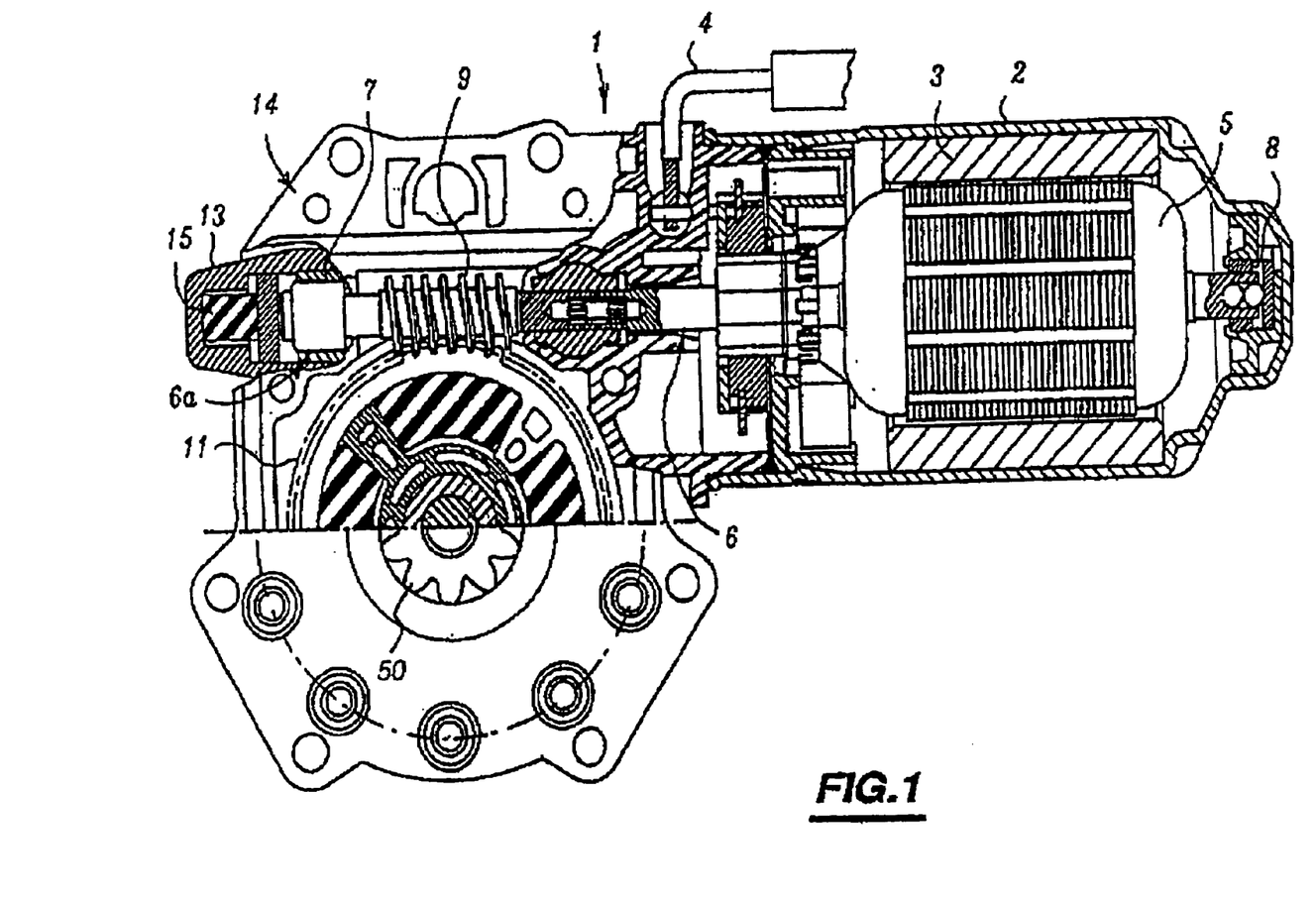
FIG. 1 is a view in longitudinal elevation and part section of a geared motor unit for driving motor vehicle equipment equipped with a device for eliminating the axial play in its driveling according to the invention.

The geared motor unit 1 illustrated in FIG. 1 is intended, in particular, for driving vehicle equipment, such as electric window lifters.

The geared motor unit 1 includes, housed inside a casing 2, a stator 3 which can be powered by electrical connections 4 in a known way, a rotor 5 equipped with a rotor shaft 6, the ends of which are mounted in rolling bearings 7 and 8. The rotor shaft 6 carries a worm 9 in mesh with a gearwheel 11 capable of driving an output member 50, which itself drives the equipment associated with the geared motor unit 1, for example, a window lifter, a sunroof, etc.

An end 6a of the rotor shaft 6 passing through the rolling bearing 7 and located near the worm 9 collaborates with a device 12 making it possible, under a given compressive axial preload F (FIG. 3), to eliminate any axial play between the end 6a of the rotor shaft 6 and a wall 13 of a reduction gearbox 14.

Figure 2:
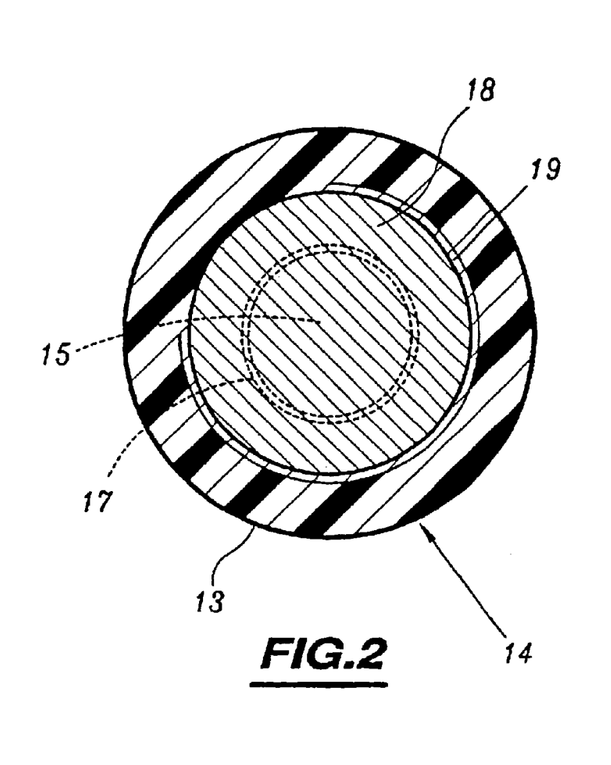
FIG. 2 is a view in cross section along line 2—2 of FIG. 3, illustrating a first embodiment of the gear motor unit according to the invention.
Figure 3:
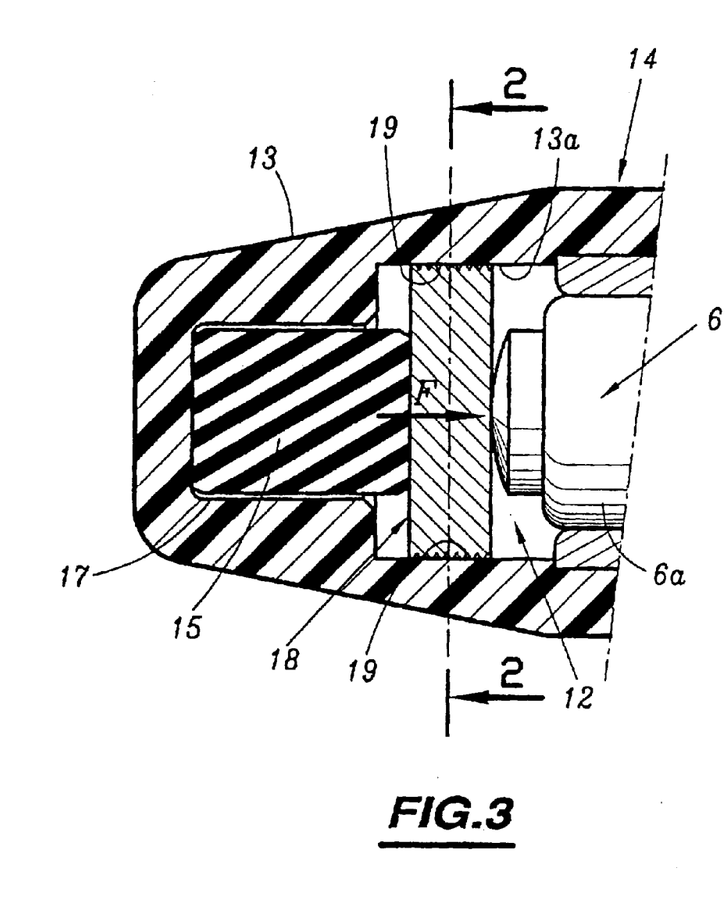
FIG. 3 is a view in partial longitudinal section showing one end of the geared motor unit of FIG. 1 equipped with a device for eliminating the axial play of the shaft according to a first embodiment of the invention.

In the embodiment illustrated in FIGS. 2 and 3, the device 12 includes a plug 15 made of an elastic material, such as an elastomer, arranged in a terminal housing 17 at the end of the wall 13 and projecting axially from the terminal housing 17 towards the end 6a of the motor shaft 6. The device 12 also includes a piston 18 inserted between the plug 15 and the end 6a of the motor shaft 6. Surface irregularities 19, such as circular grooves, a screw thread, notching, axial grooves, knurling, etc., are arranged on the peripheral surface of the piston 18 and are in contact with an interior wall 13a of the wall 13 of the reduction gearbox 14. The piston is made of metal, and the reduction gearbox 14 is made of plastic.

When the geared motor unit 1 is assembled, the piston 18 is pressed against the plug 15, precompressing it so that it exerts a compressive axial preload thrust F of an appropriate value, such as about 100 newtons, on the piston 18 and on the end 6a of the rotor shaft 6.

Once the compressive preload F has been set to the desired value, the piston 18 is immobilized in the axial position that corresponds to the compressive preload of the plug 15 by heating the plastic of the wall 13 of the reduction gearbox 14 facing the surface irregularities 19 of the piston 18 so that the molten plastic fills the surface irregularities 19, such as grooves or channels. Subsequent solidification of the plastic by cooling fixes the piston 18 permanently in this position at the wall 13 of the reduction gearbox 14. The melting of the plastic may be brought about by an appropriate device not depicted, such as an ultrasound generator or using high-frequency welding.

Once the piston 18 has been secured to the reduction gearbox 14 in this way, changes in the direction of rotation of the rotor shaft 6 can no longer cause the rotor shaft 6 to move axially, and therefore can no longer generate troublesome noise.

Figure 4:
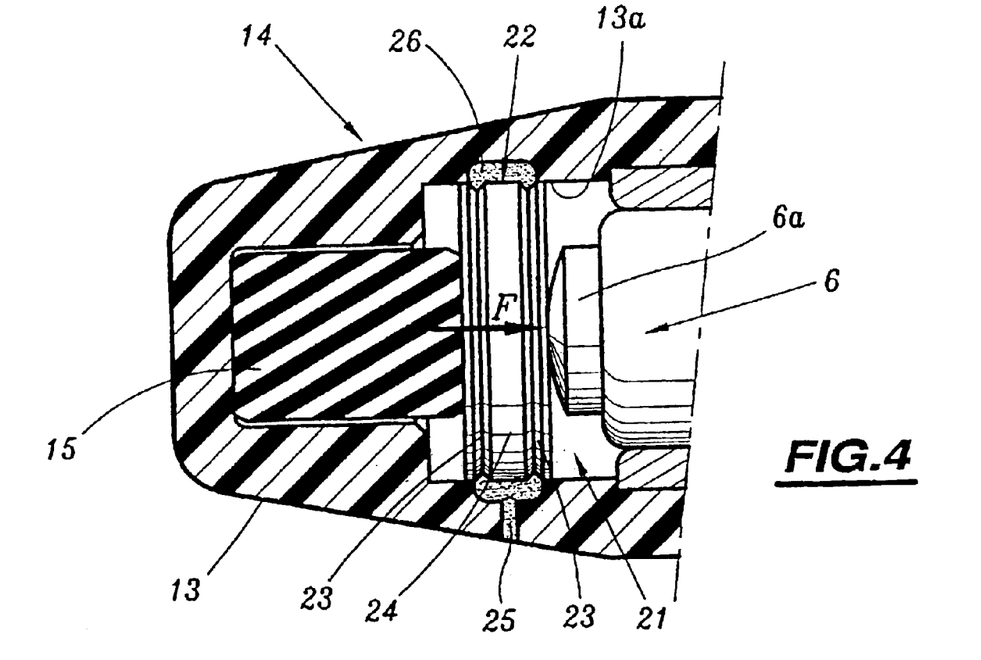
FIG. 4 is a view in partial longitudinal section similar to FIG. 3 illustrating a second embodiment of the device for eliminating axial play in the geared motor unit according to the invention.

In the second embodiment illustrated in FIG. 4, a device 21 includes a piston 22. The peripheral surface irregularities of the piston 22, in contact with the interior wall 13a, consist of two circular channels 23 fanned on the edges of the piston 22 and separated by a cylindrical region 24. Correspondingly, at least one duct 25 is arranged to the side of the piston 22 in the wall 13 of the reduction gearbox 14 and opens into an annular chamber 26 in the wall 13, the annular chamber 26 opening onto the circular channels 23.

The device 21 for eliminating axial play in the rotor shaft 6 is adjusted as follows: first, the compressive axial preload F of the plug 15 is adjusted to the desired value, so that the piston 22 is positioned exactly at the appropriate axial location opposite the annular chamber 26. Next, a liquid adhesive is injected into the at least one duct 25 to fill the annular chamber 26 and the circular channels 23. The pressure with which the liquid adhesive is injected is arbitrary. After hardening, the adhesive entirely fills the circular channels 23. The annular chamber 26 and the at least one duct 25 are thus hermetically sealed, immobilizing the piston 22 with respect to the wall 13 of the reduction gearbox 14. As before, the piston 22 eliminates any axial play of the rotor shaft 6, and therefore any parasitic noise as the rotor shaft 6 changes direction of rotation.

Figure 5:
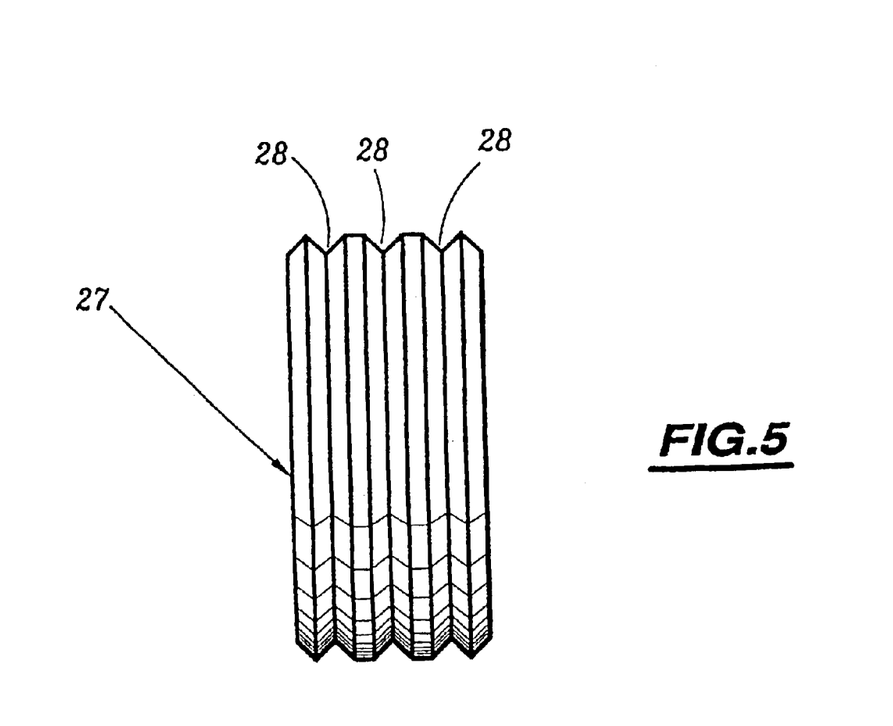
FIG. 5 is a view in side elevation of an alternative form of the piston of FIGS. 3 and 4.

In the alternative form of FIG. 5, the piston 27 has three circular channels 28, the central cylindrical region 24 having been omitted. In other respects, the use of the piston 27 is entirely similar to that of the piston 22.

Figure 6:
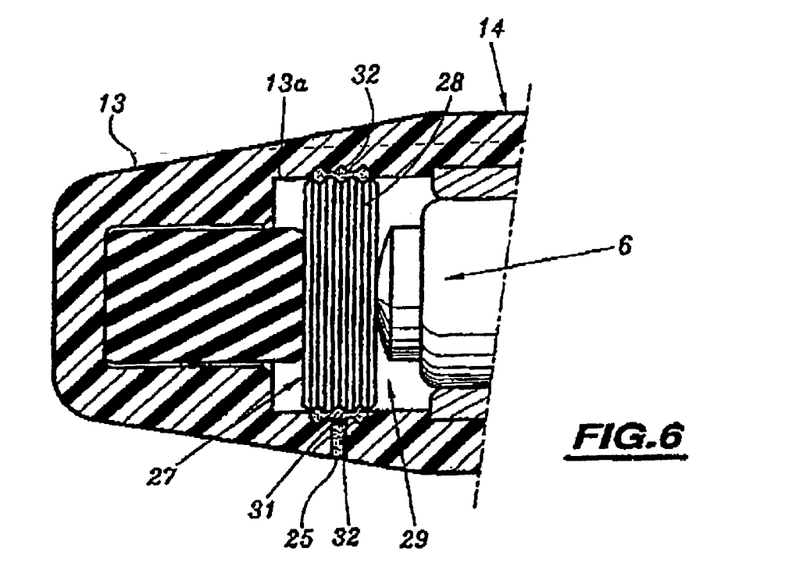
FIGS. 6, 7 and 8 are views similar to FIG. 3 of three other embodiments of the device for eliminating axial play at which the invention is intended.

In the alternative form of FIG. 6, a device 29 for eliminating the axial play of the rotor shaft 6 includes a piston 27 with a number of circular channels 28 and a peripheral counterbore 31 facing the circular channels 28 shaped so as to delimit complementary channels 32 which are formed in the wall 13 of the reduction gearbox 14. The peripheral counterbore 31 and the circular channels 28 can be filled with liquid adhesive via the at least one duct 25 and the piston 27 immobilized by the solidified adhesive.

Figure 7:
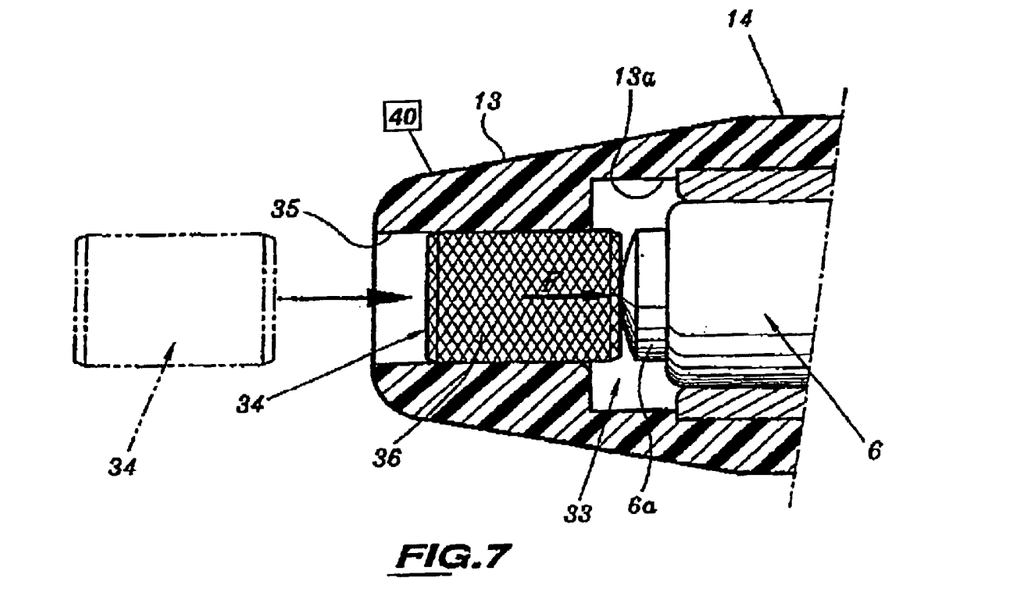
Figure 9:
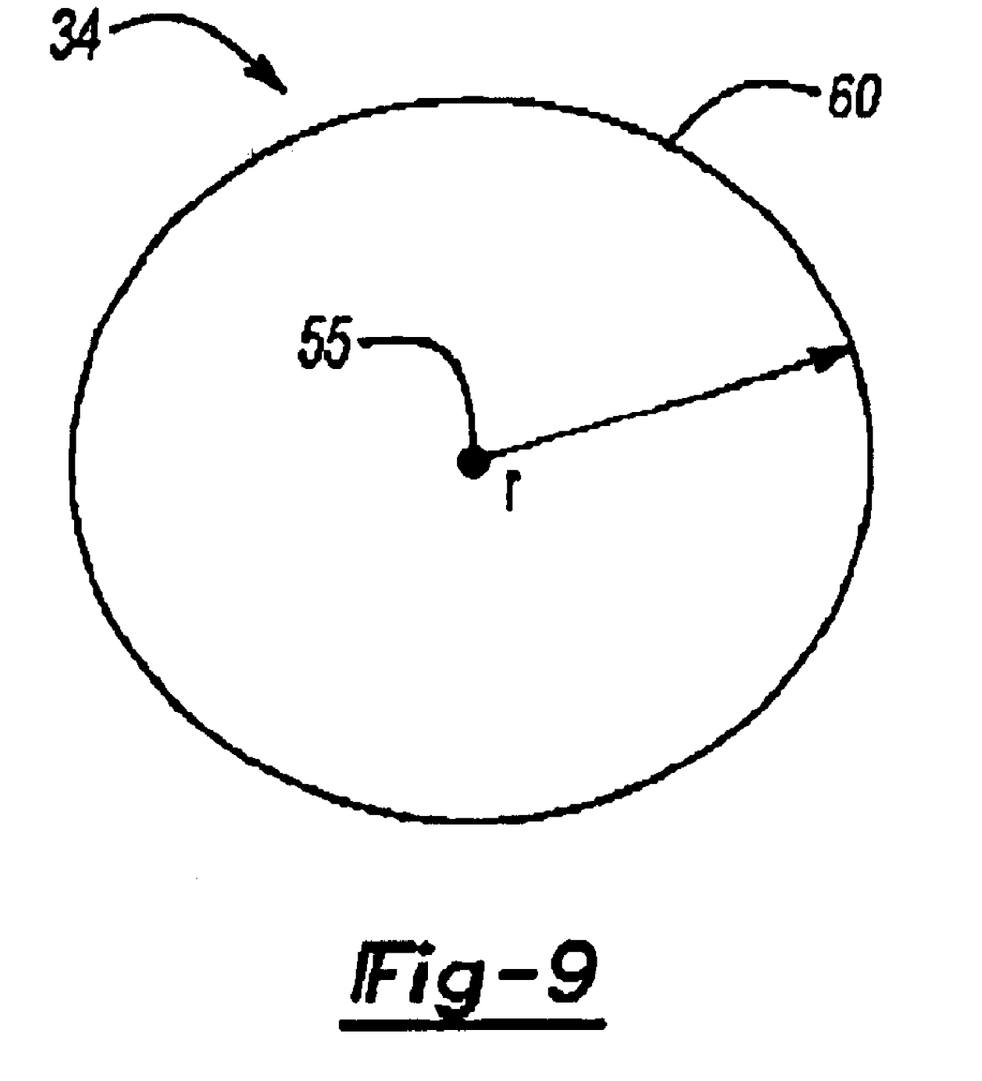
FIG. 9 illustrates a front view of the plug of FIG. 7.

FIG. 7 illustrates a fourth embodiment of the invention in which a device 33 for eliminating the play of the rotor shaft 6 includes a metal plug 34 with a diameter greater than the diameter of an axial housing 35 formed in the wall 13 of the reduction gearbox 14 facing the end 6a of the rotor shaft 6. The surface of the metal plug 34 includes surface irregularities 36 in contact with the wall 13 of the axial housing 35. For example the surface irregularities 36 can be knurling as depicted, or alternatively notching, etc. As shown in FIG. 9, the metal plug 34 includes a central axis 55 and a radial outer surface 60 extends at a radius r about the central axis 55. The surface irregularities 36 cover the radial outer surface 60 of the metal plug 34 and the radial outer surface 60 of the metal plug 34 contacts the wall 13 of the reduction gearbox 14.

The metal plug 34 is moved axially in the axial housing 35 by melting the plastic of the wall 13 using a device which is known and have not been depicted, until the metal plug 34 abuts against the end 6a of the rotor shaft 6 with a given compressive axial preload thrust F (for example, 100 newtons). The position of the metal plug 34 before it is introduced is depicted in FIG. 7 as broken lines.

The metal plug 34 is positioned axially at the precise desired location in order to place the rotor shaft 6 under compressive preload using an ultrasonic-welding machine 40 (shown schematically) which causes the plastic of the wall 13 of the axial housing 35 to melt into the surface irregularities 36. The ultrasonic-welding machine 40 is associated with a thrusting ran which defines the amount of compressive preload on the driveling. Immobilization is achieved by hardening of the plastic when the ultrasonic welding machine 40 has been shut down.

Figure 8:
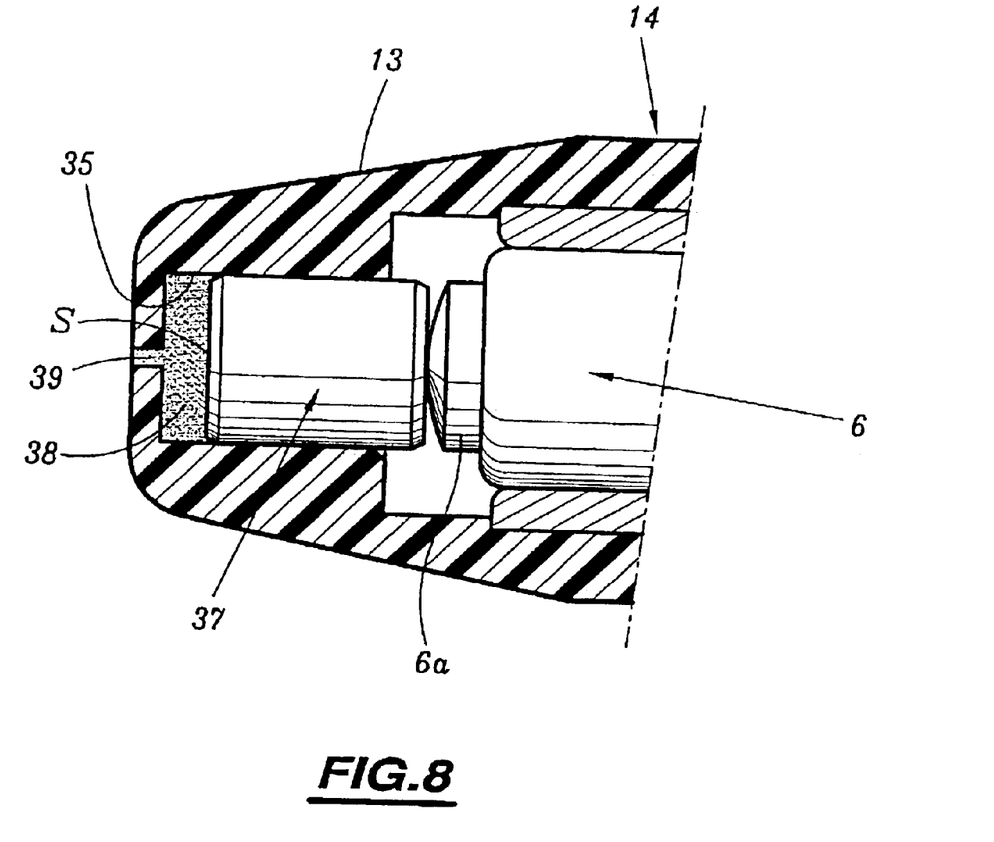

FIG. 8 illustrates a fifth embodiment which constitutes an alternative from of FIG. 7. The plug 37, preferably made of metal, has a smooth surface and is immobilized in its axial position and compresses against the end 6a of the rotor shaft 6 by a solidified adhesive 38. The adhesive 38 is injected in the liquid state through an axial nozzle 39 formed in the wall 13 of the reduction gearbox 14 and which opens into the axial housing 35. The liquid adhesive 38 is injected under a given pressure and fills that part of the axial housing 35 which is located behind the plug 37.

A hot-melt adhesive which melts at a temperature lower than the melting point of the plastic of which the reduction gearbox 14 is made (200° C.) at low pressure can be used.

By way of an unimiting numerical example, if the axial thrust F is 100 newtons, and the cross-sectional area S of the plug 37 is equal to 0.5 cm², the pressure with which the adhesive is injected must be equal to 20 bar.

Injecting a plastic identical to that of the reduction gearbox 14 is difficult to envision because it would have to be done at high pressure, which would entail a plug 37 of very low cross section.

The invention is not restricted to the embodiments described, and its execution may be varied in a number of ways. Thus, the embodiment of FIG. 8 could be modified by completely opening the axial housing 35 to the outside of the reduction gearbox 14 as depicted in FIG. 7 and arranging surface irregularities (grooves, knurling, etc.) on the surface of the plug 37 and forming a side nozzle and a counterbore in the wall 13 of the reduction gearbox 14 so that liquid adhesive can be injected against the periphery of the plug 37 once the plug 37 has been correctly axially positioned at the desired location. To perform this positioning operation, the plug 37 is pushed by an exterior precompression ram and immobilized by injecting adhesive into its grooves, via the counterbore in the reduction gearbox 14.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A geared motor unit comprising:
   a rotor having a rotor shaft, said rotor shaft having an end carrying a worm;
   a reduction gearbox having a wall, and maid reduction gearbox contains a gearwheel in mesh with maid worm, and said gearwheel drives an output member; and
   a plug including a plurality of irregularities on a surface of said plug, wherein said plug is housed in said wall of said reduction gearbox, and said reduction gearbox contacts said plug and is embedded in said plurality of irregularities on said surface of said plug to immobilize said plug and compress said plug against said end of said rotor shaft to eliminate axial play between said end of said rotor shaft and said wall of said reduction gearbox.

2. The geared motor unit as recited in claim 1, wherein said reduction gearbox is made of plastic and said plastic of said reduction gearbox having been melted to flow into said plurality of irregularities of said plug is to immobilize said plug with respect to said wall of said reduction gearbox.

3. The geared motor unit as recited in claim 2, wherein an ultrasonic welding machine melts said plastic of said reduction gearbox into said plurality of irregularities to immobilize said plug.

4. The geared motor unit according to claim 1, wherein said plurality of irregularities are notches.

5. The geared motor unit as recited in claim 1, wherein said plug exerts a compressive axial force on said rotor shaft.

6. The geared motor unit as recited in claim 1, wherein said plug has a plug diameter and said wall has a bore of a wall diameter, said plug is received in said bore and said plug diameter is greater than said wall diameter.

7. The geared motor unit as recited in claim 1, wherein said plug is metal.

8. The geared motor unit as recited in claim 1, wherein said plurality of irregularities are a plurality of knurls.

9. The geared motor unit as recited in claim 1, wherein said plurality of irregularities are intersecting grooves forming a diamond pattern.

10. The geared motor unit as recited in claim 1, wherein said plug includes a central axis and a radial outer surface extending at a radius about said central axis, and wherein said plurality of irregularities cover said radial outer surface of said plug.

11. The geared motor unit as recited in claim 10, wherein said radial outer surface of said plug contacts said wall of said reduction gearbox.

12. A method of immobilizing a plug in a geared motor unit comprising the steps of:
    inserting the plug into a wall of a plastic reduction gearbox, the plug having a plurality of irregularities on an outer surface of the plug;
    melting the plastic reduction gearbox into a melted plastic, and the melted plastic enters the plurality of irregularities; and
    solidifying the melted plastic to immobilize and compress the plug against an end of a rotor shaft in the plastic reduction gearbox to eliminate axial play between the end of the rotor shaft and the wall of the plastic reduction gearbox.

13. The method as recited in claim 12, wherein the step of melting includes employing an ultrasonic welding machine.

* * * * *

UNITED STATES PATENT AND TRADEMARK OFFICE
CERTIFICATE OF CORRECTION

PATENT NO.    : 6,843,148 B2
DATED         : January 18, 2005
INVENTOR(S)   : Marcel

It is certified that error appears in the above-identified patent and that said Letters Patent is hereby corrected as shown below:

Column 5,
Lines 41 and 42, "maid" should read as -- said --.

Column 6,
Line 4, please delete "is".

Signed and Sealed this

Third Day of May, 2005

JON W. DUDAS
*Director of the United States Patent and Trademark Office*